(12) United States Patent
Yamaguchi

(10) Patent No.: US 12,330,204 B2
(45) Date of Patent: Jun. 17, 2025

(54) METAL SHEET PUNCHING DEVICE

(71) Applicant: JFE STEEL CORPORATION, Tokyo (JP)

(72) Inventor: Naoki Yamaguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 311 days.

(21) Appl. No.: 18/022,414

(22) PCT Filed: Jun. 16, 2021

(86) PCT No.: PCT/JP2021/022870
§ 371 (c)(1),
(2) Date: Feb. 21, 2023

(87) PCT Pub. No.: WO2022/054360
PCT Pub. Date: Mar. 17, 2022

(65) Prior Publication Data
US 2023/0339008 A1    Oct. 26, 2023

(30) Foreign Application Priority Data

Sep. 14, 2020   (JP) ................................ 2020-153475

(51) Int. Cl.
*B21D 28/26*    (2006.01)
*B21D 28/34*    (2006.01)
*B21D 37/14*    (2006.01)

(52) U.S. Cl.
CPC ............. *B21D 28/26* (2013.01); *B21D 28/34* (2013.01); *B21D 37/14* (2013.01)

(58) Field of Classification Search
CPC ....... B24B 5/08; B24B 5/363; B24B 27/0641; B21D 19/005; B21D 28/26; B21D 28/34; B21D 28/16; B21D 37/14; B23P 23/04
(Continued)

(56) References Cited

U.S. PATENT DOCUMENTS

2021/0245225 A1    8/2021   Kimura

FOREIGN PATENT DOCUMENTS

| CN | 108500129 A | 9/2018 |
| CN | 108526299 A | 9/2018 |

(Continued)

OTHER PUBLICATIONS

Translation, CN-112025825-A (Year: 2025).*
(Continued)

*Primary Examiner* — Nhat Chieu Q Do
(74) *Attorney, Agent, or Firm* — Oliff PLC

(57) ABSTRACT

A metal sheet punching device includes: a die including a circular opening; and a punch configured to form a circular punched hole in the metal sheet supported by the die. The punch includes: a main body part; a cylindrical punching part; a rotating part disposed between the main body part and the punching part; a coated abrasive provided on an outer circumferential surface of the rotating part and configured to polish a sheared edge of the punched hole; a spring disposed between the main body part and the punching part and configured to contract and accumulate a part of a punching load as elastic energy, release the elastic energy and extend after the punching part punches the metal sheet; and a rotational motion conversion device configured to convert a linear motion in the punching direction due to extension of the spring into a rotary motion of the rotating part.

2 Claims, 6 Drawing Sheets

(58) Field of Classification Search
USPC .................................................. 83/698.91
See application file for complete search history.

(56) References Cited

FOREIGN PATENT DOCUMENTS

| | | | | | |
|---|---|---|---|---|---|
| CN | 109129796 | A | * | 1/2019 | ............... B24B 9/18 |
| CN | 109482713 | A | | 3/2019 | |
| CN | 208729140 | U | | 4/2019 | |
| CN | 209222981 | U | | 8/2019 | |
| CN | 210586671 | U | | 5/2020 | |
| CN | 112025825 | A | * | 12/2020 | ............ B24B 47/12 |
| JP | H11-290967 | A | | 10/1999 | |
| JP | 3167826 | B2 | | 5/2001 | |
| JP | 2002-66653 | A | | 3/2002 | |
| JP | 2004-283875 | A | | 10/2004 | |
| JP | 2008-137073 | A | | 6/2008 | |
| JP | 2009-012018 | A | | 1/2009 | |
| JP | 5287548 | B2 | | 9/2013 | |
| JP | 6749880 | B2 | | 9/2020 | |
| WO | 2009/125786 | A1 | | 10/2009 | |

OTHER PUBLICATIONS

Translation, CN_109129796_ (Year: 2025).*
Dec. 8, 2023 extended Search Report issued in European Patent Application No. 21866321.9.
Jul. 27, 2021 Search Report issued in International Patent Application No. PCT/JP2021/022870.
Yoshitake et al., "Fatigue Properties of High-strength Hot Rolled Steel Sheets with Punched Hole", Proceedings of the Japan Society of Automotive Engineers, vol. 33, No. 4, pp. 203-208, 2002.

* cited by examiner (a) BEFORE PUNCHING (b) CONTRACTION OF SPRING (c) IMMEDIATELY AFTER PUNCHING AND POLISHING (a) BEFORE PUNCHING (b) CONTRACTION OF SPRING (a) IMMEDIATELY AFTER PUNCHING AND POLISHING (b) PULLING OUT OF PUNCH

METAL SHEET PUNCHING DEVICE

This application is a National Stage of International Application No. PCT/JP2021/022870 filed Jun. 16, 2021, which is based upon and claims benefit of priority from Japanese Patent Application No. 2020-153475 filed Sep. 14, 2020, the entire contents of the prior applications being incorporated herein by reference.

FIELD

The present invention relates to a metal sheet punching device, and more particularly to a metal sheet punching device that forms a punched hole with improved fatigue strength of a sheared edge.

BACKGROUND

It is known that a sheared edge of a punched hole of a metal sheet subjected to blanking has lower fatigue strength than an end surface of a hole subjected to machining by a drill or the like because tensile residual stress in the circumferential direction of the punched hole is generated by blanking, the end surface is rough, and the like (see Non Patent Literature 1), which causes fatigue fracture in an automotive part and the like. Therefore, it is desired to improve the properties of the sheared edge of the punched hole of the metal sheet subjected to blanking to improve the fatigue strength.

In order to form a punched hole with improved properties of the sheared edge, for example, the following technique has been proposed. Patent Literature 1 and Patent Literature 2 propose a method of subjecting a metal sheet to plastic deformation to form an indentation in advance and then punching out the metal sheet. Meanwhile, Patent Literature 3 proposes a method of rubbing a sheared edge of a punched hole of a metal sheet by providing, in a punch at a position on a further base-end side than a shearing part located on a distal end side of the punch, a large-size part having a diameter larger than that of the shearing part, and moving the punch further in a punching direction from a state where the shearing part penetrates the punched hole to let the large-size part pass through the punched hole. Meanwhile, Patent Literature 4 proposes a method using a combination of a punch, a die, and a blank holder of subjecting a metal sheet to blanking while pressing the metal sheet with the blank holder in conjunction with movement of the punch.

CITATION LIST

Patent Literature

Patent Literature 1: JP 2009-12018 A
Patent Literature 2: JP 2008-137073 A
Patent Literature 3: WO 2009-125786 A
Patent Literature 4: JP 2004-283875 A

Non Patent Literature

Non Patent Literature 1: Yoshitake et al., Proceedings of the Japan Society of Automotive Engineers, Vol. 33, No. 4, pp. 203-208 (2002).

SUMMARY

Technical Problem

However, in the methods disclosed in Patent Literature 1 and Patent Literature 2, since another mold is needed in addition to a tool for forming a punched hole in a metal sheet, there is a problem that the number of steps increases and productivity is low. In addition, the method disclosed in Patent Literature 3 has a problem that the metal sheet around the punched hole is deformed when the large-size part passes through the punched hole.

Further, the method disclosed in Patent Literature 4 is described as a method in which the fatigue strength can be improved by increasing the ratio of a shear surface in the sheared edge. However, even if the above method is employed, a fracture surface remains in the sheared edge, and thus the occurrence of cracks in the fracture surface cannot be sufficiently suppressed. Furthermore, since the blank holder having a special shape is needed, there is a problem that an applicable place is limited.

The present invention has been made in view of the above problems, and aims to provide a metal sheet punching device capable of forming a punched hole having improved properties of a sheared edge in one step without requiring another mold in addition to a mold for forming a punched hole, inhibiting a crack from being generated in the sheared edge, and improving fatigue strength.

Solution to Problem

A metal sheet punching device according to the present invention includes: a die including a circular opening and configured to support a metal sheet; and a punch configured to form a circular punched hole in the metal sheet supported by the die, wherein the punch includes: a main body part; a cylindrical punching part provided at a distal end; rotating part disposed between the main body part and the punching part so as to be rotatable about a central axis of the punching part as a rotation axis; a coated abrasive provided on an outer circumferential surface of the rotating part and configured to polish a sheared edge of the punched hole; spring disposed between the main body part and the punching part so as to be capable of contracting and extending in a punching direction, the spring being configured to contract and accumulate a part of a punching load as elastic energy until the punching part comes into contact with and punches the metal sheet, release the elastic energy, and extend after the punching part punches the metal sheet; and a rotational motion conversion device configured to convert a linear motion in the punching direction of the punching part due to extension of the spring into a rotary motion of the rotating part.

The rotational motion conversion device may include: a plate-shaped rack provided to extend in the punching direction from a distal end of the main body part; first gear disposed so as to be rotatable about an axis orthogonal to the punching direction and including a first spur gear part meshing with the plate-shaped rack, and a first bevel gear part provided coaxially with the first spur gear part; a second gear disposed so as to be rotatable about an axis parallel to the punching direction and including a second bevel gear part meshing with the first bevel gear part, and a second spur gear part provided coaxially with the second bevel gear part; a gear support provided in the punching part to rotatably support each of the first gear and the second gear; and a cylindrical rack provided on an inner circumferential surface side of the rotating part and configured to mesh with the second spur gear part.

Advantageous Effects of Invention

In the present invention, by forming the punched hole and polishing the sheared edge of the punched hole, it is possible to reduce unevenness of the sheared edge and prevent the direction of a polishing mark on the sheared edge from matching the direction of a crack generated in the sheared edge when a load is repeatedly applied to the metal sheet in which the punched hole is formed, and also possible to form the punched hole of the sheared edge having excellent fatigue strength in one step without requiring a power source other than the power source for punching the metal sheet. In addition, according to the present invention, it is possible to expect improvement in formability by preventing ductile fracture of the sheared edge when press forming is performed after punching, and improvement in delayed fracture characteristics in which brittleness-like fracture occurs when a predetermined time elapses in a state where a metal sheet having a punched hole is subjected to a static load. Further, by reducing the unevenness of the sheared edge to reduce the surface area, improvement in coating properties and corrosion resistance of the coating material can also be expected.

DESCRIPTION OF EMBODIMENTS

In order to solve the above problems, the inventors of the present invention first conducted intensive studies on the properties and fatigue strength of a sheared edge of a punched hole obtained by blanking.

Figure 6:
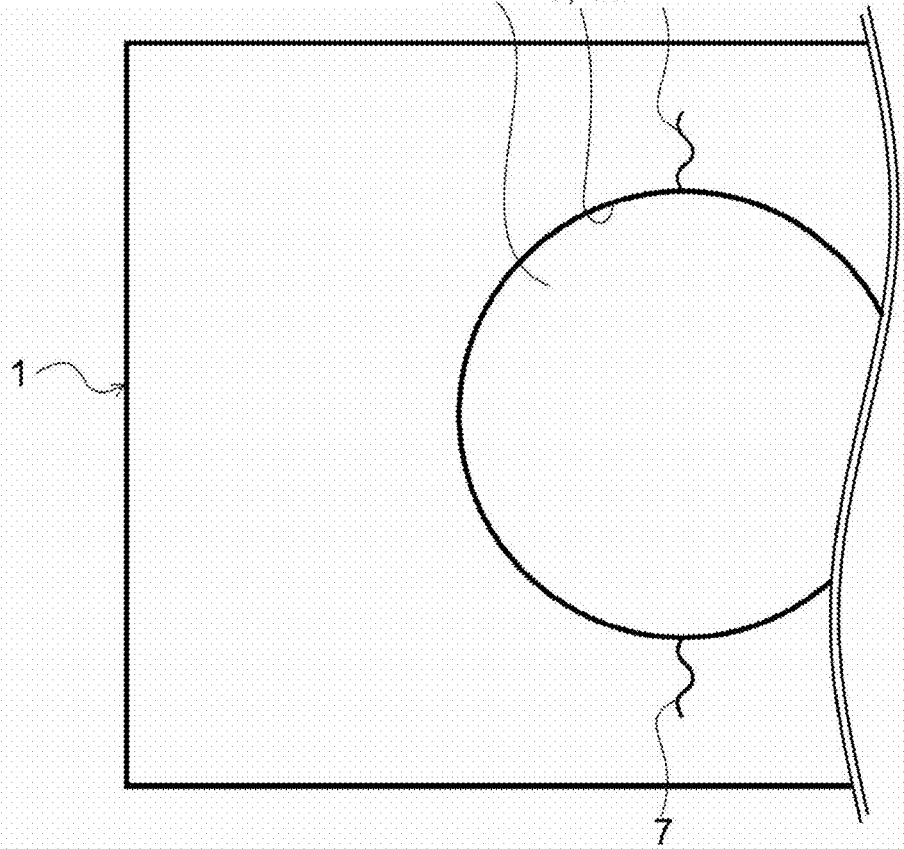
FIG. 6 is a cross-sectional view illustrating a sheared edge of a punched hole formed in a metal sheet by blanking.

FIG. 6(a) illustrates a cross-sectional view (side surface) of a punched hole 3 formed by subjecting a metal sheet 1 to blanking. A sheared edge 5 of the punched hole 3 is divided into a shear surface 5a and a fracture surface 5b. When a load is repeatedly applied to this metal sheet 1 in which the punched hole 3 is formed, as illustrated in the top view of FIG. 6(b), a crack 7 is likely to occur in the fracture surface 5b of the sheared edge 5, which results in fatigue fracture starting from the crack 7.

In addition, in an unevenness of the fracture surface 5b, with a portion where recesses are continuous in a punching direction by the punch serving as a starting point, the crack 7 develops due to a tensile stress in the circumferential direction of the punched hole applied due to blanking or a stress such as bending of the metal sheet. Further, it has become clear that the generation of the crack 7 is accelerated even if the direction of the polishing mark remaining on the sheared edge 5 is in the punching direction.

Therefore, the inventor has obtained a finding that, by using a punch having a cylindrical punching part, a rotating part rotatable about a central axis of the punching part as a rotation axis, and a coated abrasive provided on an outer circumferential surface of the rotating part, subjecting a metal sheet to blanking to form a punched hole, rotating the rotating part in a state where the rotating part is located inside the punched hole, and polishing a sheared edge of the punched hole with the coated abrasive, it is possible to form the punched hole and polish the sheared edge in one step so that the direction of a polishing mark and the direction of a crack do not match each other, and thus solve the above problem.

Furthermore, the inventor has conceived of an idea that, by providing a spring between a main body part and the punching part at a distal end of the punch and providing a device for accumulating a part of a punching load as elastic energy of the spring and releasing the elastic energy accumulated in the spring after punching to rotate the rotating part, it is possible to polish the sheared edge without requiring a power source for rotating the rotating part other than a power source for blanking.

A metal sheet punching device according to an embodiment of the present invention is described below. Note that, in this specification and the drawings, elements having substantially the same function and configuration are denoted by the same reference signs, and redundant description is omitted. In addition, in the drawings used in the following description, in order to facilitate understanding of features, features may be illustrated in an enlarged manner for convenience, but dimensions, ratios, and the like of each component are not necessarily the same as actual dimensions, ratios, and the like.

Figure 1:
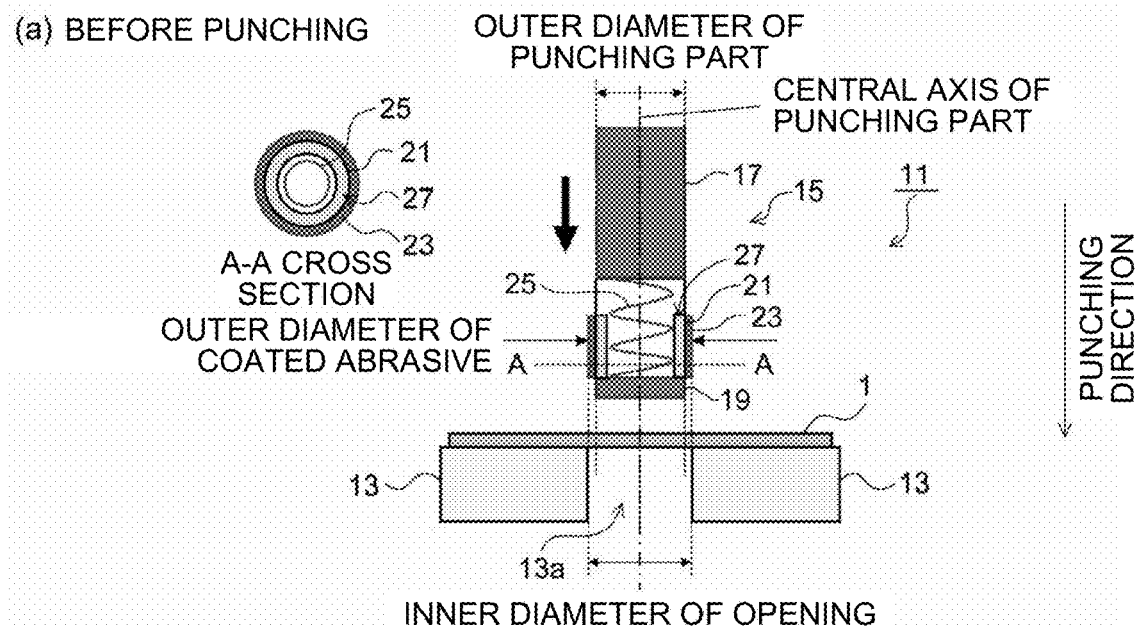
FIG. 1 is a cross-sectional view illustrating a metal sheet punching device according to an embodiment of the present invention and an operation thereof ((a) before punching, (b) contraction of spring, (c) immediately after punching and polishing).
Figure 1:
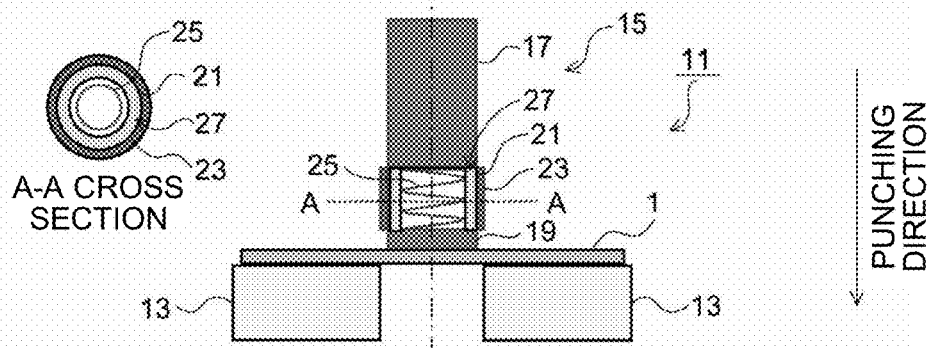
Figure 1:
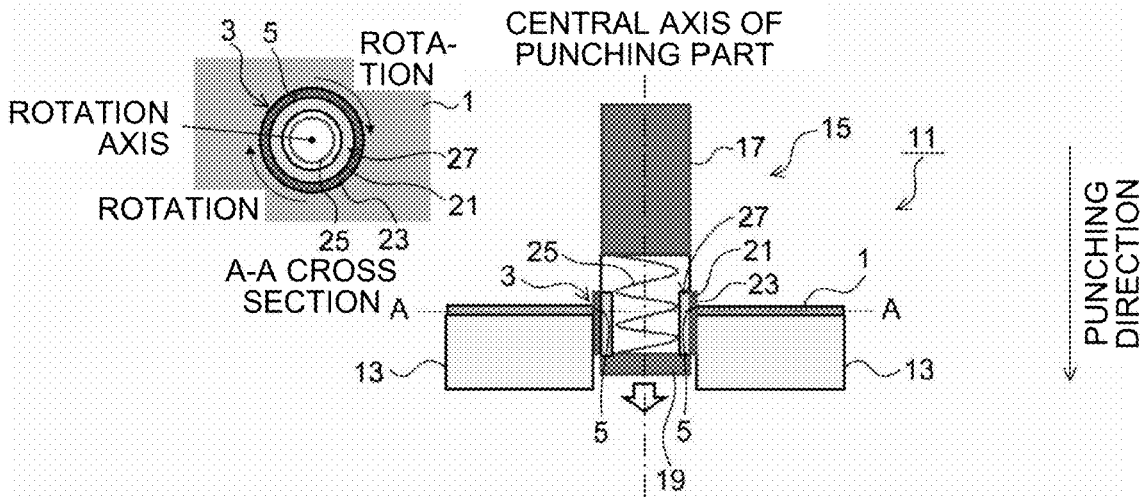

As illustrated in FIG. 1 as an example, a metal sheet punching device 11 (Hereinafter, referred to as a "punching device 11") according to the embodiment of the present invention forms the punched hole 3 in the metal sheet 1 using a die 13 and a punch 15.

The die 13 has a circular opening 13a and is designed to support the metal sheet 1. The punch 15 includes a main body part 17, a cylindrical punching part 19 provided at its distal end in a punching direction, a rotating part 21, a coated abrasive 23, a spring 25, and a rotational motion conversion device 27.

The rotating part 21 is disposed between the main body part 17 and the punching part 19 so as to be rotatable about the central axis of the punching part 19 as a rotation axis.

The coated abrasive 23 is provided on the outer circumferential surface of the rotating part 21, and is designed to polish the sheared edge 5 of the punched hole 3 by the rotation of the rotating part 21.

The spring 25 is disposed between the main body part 17 and the punching part 19 so as to be able to contract and extend in the punching direction. Then, in the process of punching the metal sheet 1 by moving the punch 15 in the punching direction, the spring 25 contracts and accumulates a part of a punching load as elastic energy until the punching part 19 comes into contact with and punches the metal sheet 1, and after the punching part 19 punches the metal sheet 1, the spring 25 releases the elastic energy accumulated in the spring 25 and extends. Note that the punching direction is a direction in which the punch 15 is relatively moved toward the die 13 in order to form the punched hole 3 in the metal sheet 1.

The rotational motion conversion device 27 is configured to convert a linear motion in the punching direction of the punching part 19 due to extension of the spring 25 into a rotary motion of the rotating part 21.

Figure 2:
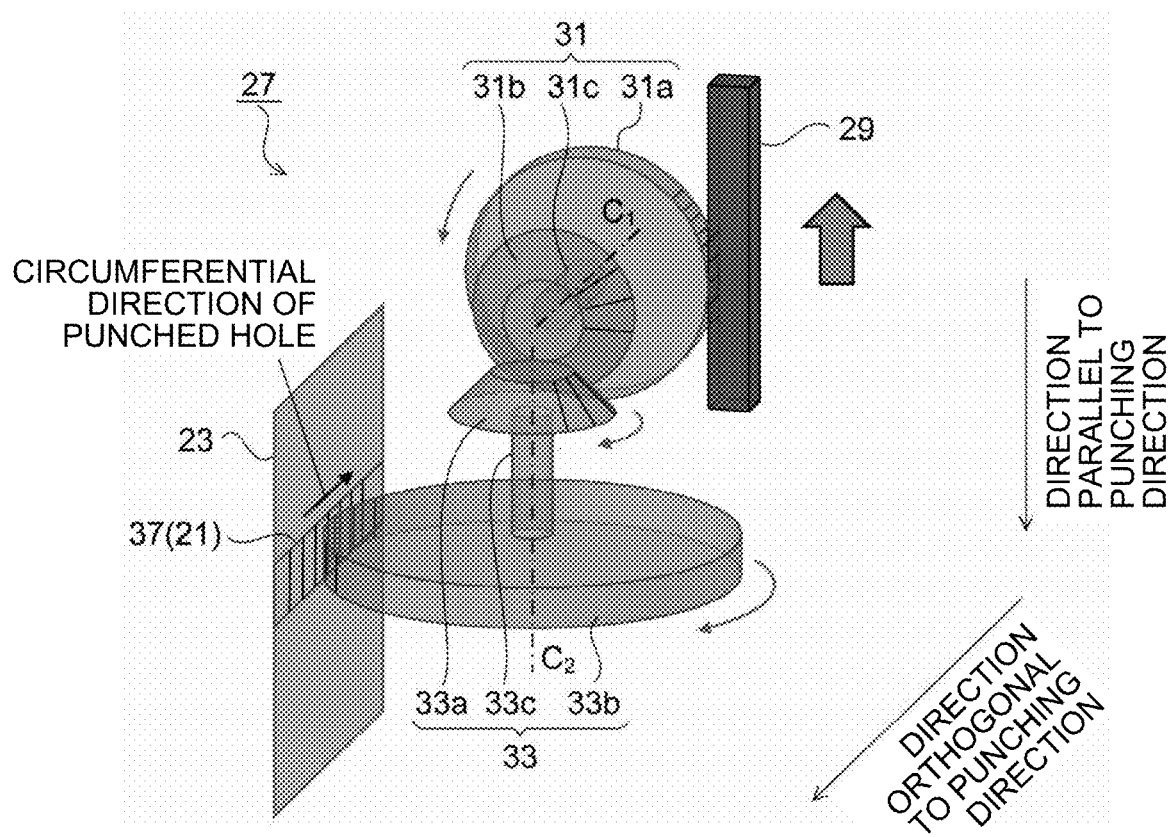
FIG. 2 is a perspective view illustrating an example of a specific configuration of a rotational motion conversion device of the metal sheet punching device according to the embodiment of the present invention.
Figure 3:
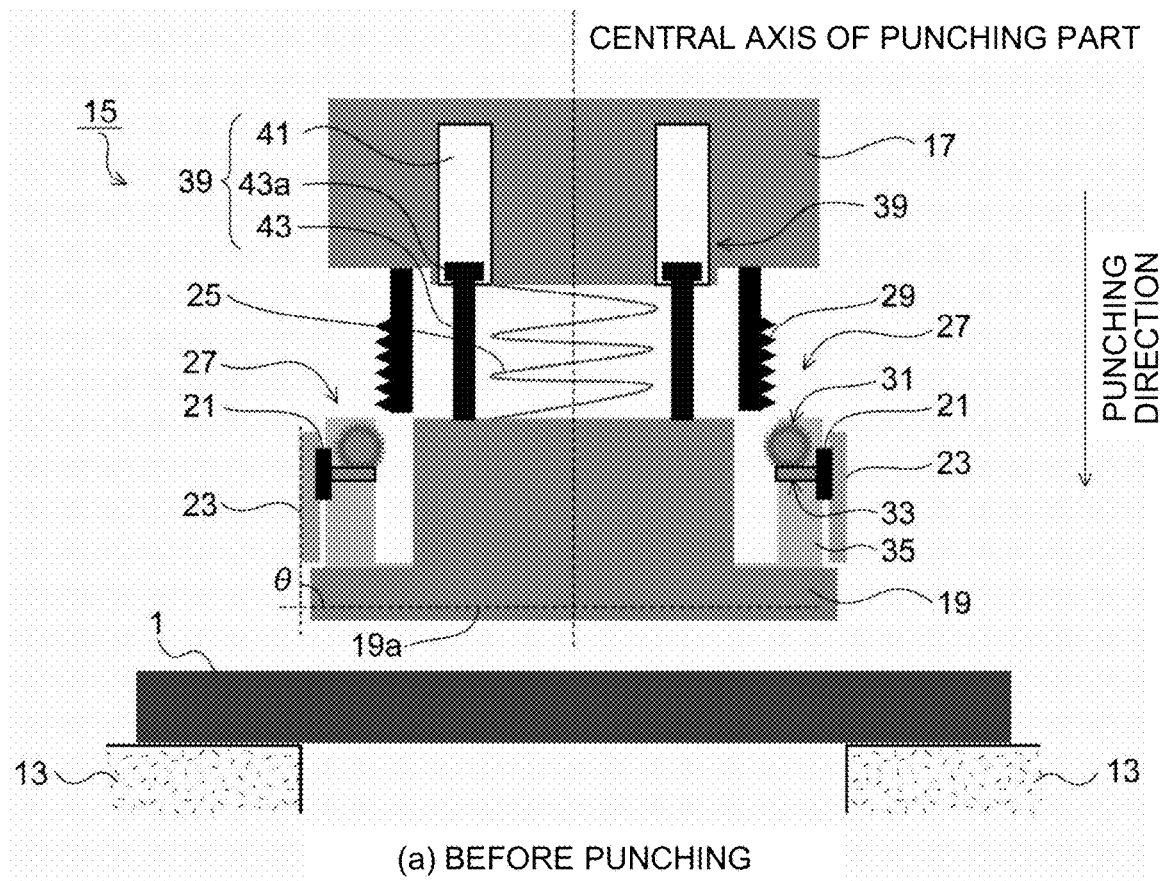
FIG. 3 is a cross-sectional view illustrating a punch and an operation of the metal sheet punching device according to the embodiment of the present invention (part 1) ((a) before punching, (b) contraction of spring).
Figure 3:
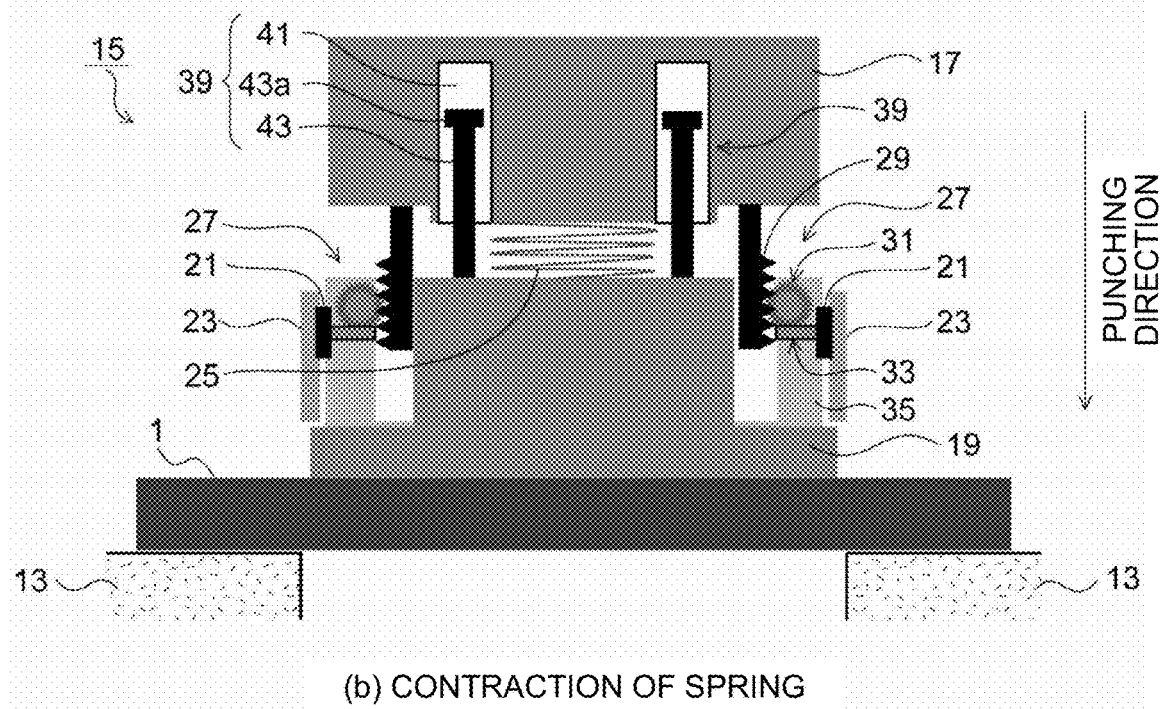
Figure 4:
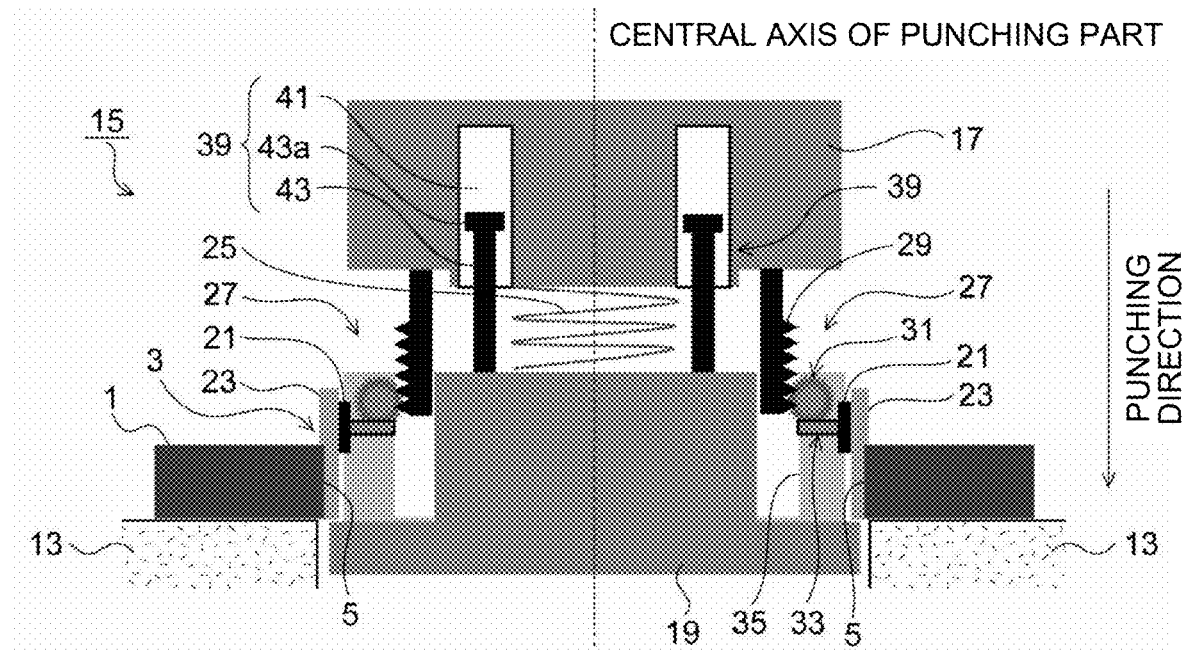
FIG. 4 is a cross-sectional view illustrating the punch and the operation of the metal sheet punching device according to the embodiment of the present invention (part 2) ((a) immediately after punching and polishing, (b) extraction of punch).
Figure 4:
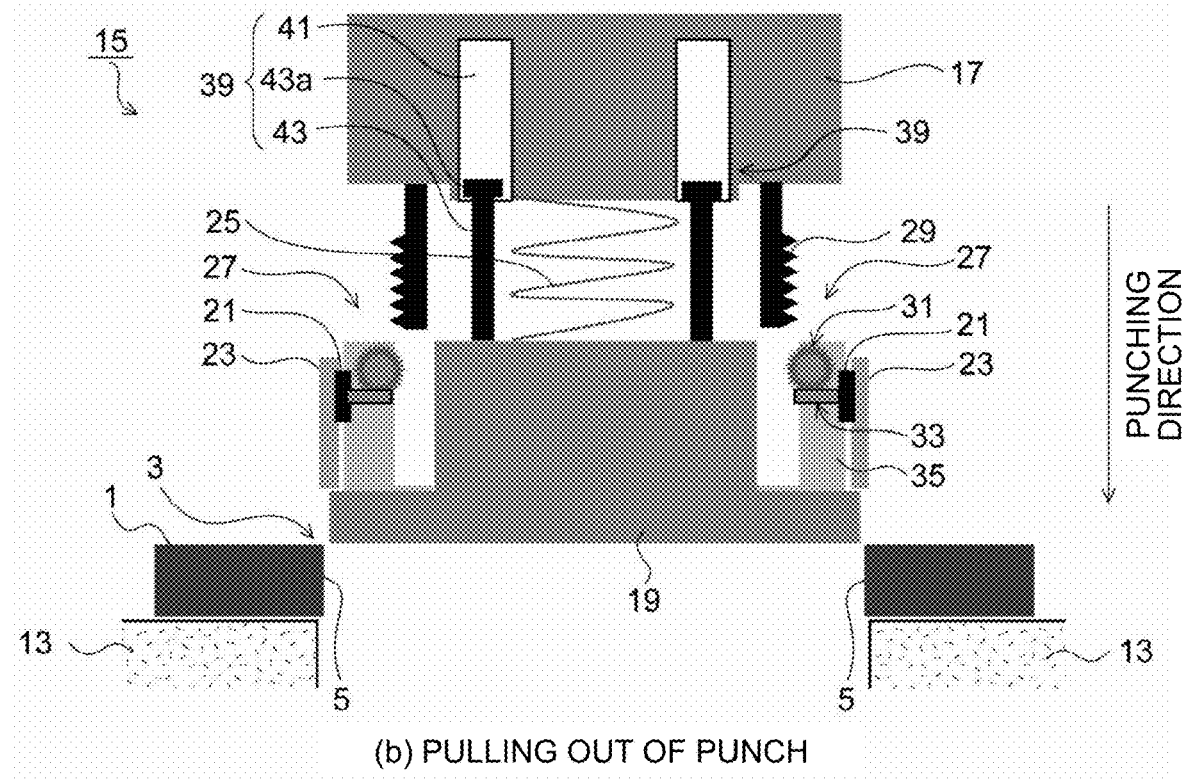

An example of a specific configuration of the rotational motion conversion device 27 is illustrated in FIGS. 2 to 4.

As illustrated in FIGS. 2 to 4, the rotational motion conversion device 27 includes a plate-shaped rack 29, a first gear 31, a second gear 33, and a gear support 35.

The plate-shaped rack 29 is provided to extend in the punching direction from a distal end of the main body part 17, and moves together with the main body part 17 when the punch 15 is moved in the punching direction.

As illustrated in FIG. 2, the first gear 31 includes a first spur gear part 31a meshing with the plate-shaped rack 29 and a first bevel gear part 31b provided coaxially with the rotation axis of the first spur gear part 31a, and is disposed rotatably about an axis orthogonal to the punching direction (about an axis C1 in FIG. 2). Here, the first spur gear part 31a and the first bevel gear part 31b are connected by a first gear shaft part 31c so that they can rotate coaxially.

As illustrated in FIG. 2, the second gear 33 includes a second bevel gear part 33a meshing with the first bevel gear part 31b and a second spur gear part 33b provided coaxially with the rotation axis of the second bevel gear part 33a, and is disposed rotatably about an axis parallel to the punching direction (about an axis C2 in FIG. 2). Here, the second bevel gear part 33a and the second spur gear part 33b are connected by a second gear shaft part 33c so that they can rotate coaxially.

As illustrated in FIGS. 3 and 4, the gear support 35 is provided in the punching part 19 to rotatably support each of the first gear 31 and the second gear 33.

A cylindrical rack 37 is provided on the inner circumferential surface side of the rotating part 21 and meshes with the second spur gear part 33b. Here, as illustrated in FIG. 2, the cylindrical rack 37 is the same as the rotating part 21, and the coated abrasive 23 is directly attached to the outer circumferential surface of the cylindrical rack 37. However, the cylindrical rack 37 is not limited to one which is the same as the rotating part 21, and may be separately provided on the inner circumferential surface side of the rotating part 21, for example.

Next, the operation of the punching device 11 in the process of forming the punched hole 3 in the metal sheet 1 using the punching device 11 is described with reference to FIGS. 1 to 4.

First, the metal sheet 1 is placed so as to straddle the opening 13a of the die 13, the metal sheet 1 is supported at its both end sides, and the punch 15 is installed above the metal sheet 1 (FIG. 1(a) and FIG. 3(a)).

Next, the punch 15 is moved in the punching direction, and the spring 25 is contracted until the punch 15 comes into contact with the metal sheet 1 and punches the metal sheet 1. As a result, a part of a punching load is accumulated in the spring 25 as elastic energy (FIG. 1(b) and FIG. 3(b)).

Subsequently, the punch 15 is further applied with a punching load to cause the punching part 19 to punch the metal sheet 1, so that the elastic energy accumulated in the spring 25 is released and the spring 25 extends. As a result, the punching part 19 linearly moves in the punching direction toward the opening 13a of the die 13, and the rotating part 21 is located inside the punched hole 3 (FIG. 1(c) and FIG. 4(a)).

Along with the linear motion of the punching part 19, as illustrated in FIG. 2, the plate-shaped rack 29 relatively moves in the direction opposite to the punching direction, and the first gear 31 rotates via the first spur gear part 31a meshing with the plate-shaped rack 29. Then, the rotation of the first gear 31 is transmitted to the second bevel gear part 33a meshing with the first bevel gear part 31b, and the second gear 33 rotates.

Thus, the rotation of the second gear 33 is transmitted to the rotating part 21 (the cylindrical rack 37 in FIG. 2) meshing with the second spur gear part 33b, and the rotating part 21 rotates. As a result, the sheared edge 5 of the punched hole 3 is polished by the coated abrasive 23 provided on the outer circumferential surface of the rotating part 21 (FIG. 1(c) and FIG. 4(a)).

After the spring 25 has fully extended and the rotation of the rotating part 21 has stopped, the punch 15 is moved in the direction opposite to the punching direction to pull out the punch 15 from the punched hole 3 (FIG. 4(b)).

As described above, according to the metal sheet punching device 11 according to the embodiment of the present invention, a part of the punching load of the metal sheet 1 by the punch 15 is accumulated in the spring 25 as elastic energy, and after the metal sheet 1 is punched to form the punched hole 3, the elastic energy accumulated in the spring 25 is released and thus the rotating part 21 rotates. Then, the coated abrasive 23 provided on the outer circumferential surface of the rotating part 21 polishes the sheared edge 5 of the punched hole 3, so that the rotating part 21 is rotated without requiring a power source other than the power source for punching the metal sheet 1, and the sheared edge 5 is polished in one step to form the punched hole 3 with reduced unevenness.

Further, it is possible to prevent the direction of a polishing mark on the sheared edge 5 polished by the coated abrasive 23 from matching the direction of a crack generated in the sheared edge 5 when a load is repeatedly applied to the metal sheet 1 in which the punched hole 3 is formed. As a result, it is possible to inhibit a crack from being generated in the sheared edge 5 when a repeated load is applied, and to form the punched hole 3 with improved fatigue strength.

Furthermore, according to the metal sheet punching device 11 according to this embodiment, improvement in formability by preventing ductile fracture of the sheared edge 5 when press forming is performed after punching, improvement in delayed fracture characteristics of the punched hole 3, and improvement in coating properties and corrosion resistance of a coating material by reducing the unevenness of the sheared edge 5 to reduce the surface area can also be expected.

Note that the strength of the spring 25 may be any strength as long as the strength is enough to punch the metal sheet 1 in a state where the spring is contracted when the punching part 19 comes into contact with the metal sheet 1.

Meanwhile, the rotating part 21 is preferably of a cylindrical shape. The coated abrasive 23 is not limited to one provided so as to cover the entire outer circumferential surface of the rotating part 21, and may be one provided on a part of the outer circumferential surface of the rotating part 21.

Meanwhile, in order to sufficiently polish the sheared edge 5 of the punched hole 3 by the rotation of the rotating part 21, the coated abrasive 23 is preferably set so that the coated abrasive 23 provided on the outer circumferential surface of the rotating part 21 extends outward of the outer circumferential surface of the punching part 19, that is, the outer diameter of the coated abrasive 23 provided on the outer circumferential surface of the rotating part 21 is equal to or larger than the outer diameter of the punching part 19.

However, when the outer diameter of the coated abrasive 23 provided on the outer circumferential surface of the rotating part 21 is too larger than the outer diameter of the punching part 19, after the rotating part 21 provided with the coated abrasive 23 on its outer circumferential surface is inserted into the punched hole 3, the coated abrasive 23 extends outward of the sheared edge 5 of the punched hole 3. As a result, even if the rotating part 21 can be inserted into the punched hole 3, when the rotating part 21 is rotated, the coated abrasive 23 polishes not only the sheared edge 5 but also the opening 13a of the die 13, so that the life of the coated abrasive 23 may be reduced. Accordingly, the outer diameter of the coated abrasive 23 provided on the outer circumferential surface of the rotating part 21 is preferably about the same as the inner diameter of the opening 13a of the die 13.

Meanwhile, the punch 15 used in the above description is one in which the surface of the coated abrasive 23 is parallel to the punching direction, that is, an angle θ (see FIG. 3(a)) formed by the surface of the coated abrasive 23 and a cross-section 19a orthogonal to the central axis of the punching part 19 is 90°.

However, the angle θ formed by the surface of the coated abrasive 23 and the cross-section 19a orthogonal to the central axis of the punching part 19 is not limited to 90°. For example, as a preliminary test, the punched hole 3 may be formed in the metal sheet 1 without providing the coated abrasive 23 to the punch 15 and an angle θ' (see FIG. 6) formed by the fracture surface 5b at the sheared edge 5 and the surface 1a of the metal sheet 1 may be measured, and then the angle θ may be set within a predetermined error range from the angle θ' measured by the preliminary test. The predetermined error range is ±3° or less, for example.

As a result, the fracture surface 5b on which the crack 7 is likely to occur when a repeated load is applied can be intensively polished. Note that, for installing the coated abrasive 23 so that the angle θ formed by the surface of the coated abrasive 23 and the cross-section 19a orthogonal to the central axis of the punching part 19 becomes a predetermined angle, for example, the shape of the outer circumferential surface of the rotating part 21 may be appropriately set.

Meanwhile, it is preferable to use a general buff for the coated abrasive 23. However, if the coated abrasive 23 does not have stretching properties in its thickness direction, there is a possibility that the coated abrasive cannot be removed from the punched hole 3. Therefore, it is preferable to appropriately select the type and material of the coated abrasive 23.

Further, the yarn count (grain size) of the coated abrasive 23 is not particularly limited, but is preferably determined according to the hardness and the like of the metal sheet 1, and is preferably about #80 to #240 for a general steel sheet as the metal sheet 1.

Note that, in the punching device 11 having the rotational motion conversion device 27 described above, even when the spring 25 is contracted until the metal sheet 1 is punched out, the first spur gear part 31a meshing with the plate-shaped rack 29 rotates, so that the rotating part 21 rotates. At this time, the rotating part 21 rotates in a direction opposite to the rotation of the rotating part 21 after the metal sheet 1 is punched out. However, the rotation of the rotating part 21 rotating until the metal sheet 1 is punched out does not contribute to the polishing of the sheared edge 5 of the punched hole 3, and conversely, it may shorten the life of the gear and the like of the punching device 11.

To deal with this, for example, a ratchet mechanism (not illustrated) for preventing reverse rotation of the rotating part 21 may be provided in the first spur gear part 31a of the first gear 31 in the rotational motion conversion device 27 to suppress reverse rotation of the rotating part 21 until the metal sheet 1 is punched out.

Furthermore, the punching device 11 according to this embodiment preferably includes a drop preventing mechanism 39 as illustrated in FIGS. 3 and 4, for example. The drop preventing mechanism 39 includes a hole part 41 formed in a direction opposite to the punching direction from the distal end of the main body part 17, and a drop preventing rod 43 provided to extend from the rear end of the punching part 19 toward the main body part 17 and inserted into the hole part 41. A stopper 43a for preventing the drop preventing rod 43 from coming off from the hole part 41 is provided at the rear end of the drop preventing rod 43.

As described above, according to the punching device 11 having the drop preventing mechanism 39, in the process of punching the metal sheet 1, polishing the sheared edge 5, and then pulling out the punch 15 from the punched hole 3, the stopper 43a is caught by the inlet of the hole part 41, so that the punching part 19 can be prevented from dropping from the punch 15.

EXAMPLES

An experiment having been conducted for confirming the operation and effect of the metal sheet punching device according to the present invention is described below.

In the experiment, first, a 780 MPa class hot rolled steel sheet (sheet thickness: 2.9 mm) was used as the metal sheet 1, and the punched hole 3 was formed in the metal sheet 1 by the punching device 11 illustrated in FIG. 1.

The outer diameter of the punching part 19 of the punching device 11 was set to 10 mm, and the clearance between the outer diameter of the punching part 19 and the inner diameter of the opening 13a of the die 13 was set to 10%.

As the coated abrasive 23 provided on the outer circumferential surface of the rotating part 21, coated abrasive with a yarn count of #120 was used, the outer diameter of the coated abrasive 23 provided to the rotating part 21 was set to 10 mm, and the angle θ (see FIG. 3(a)) formed by the coated abrasive 23 and the cross-section 19a orthogonal to the central axis of the punching part 19 was set to 90°.

Figure 5:
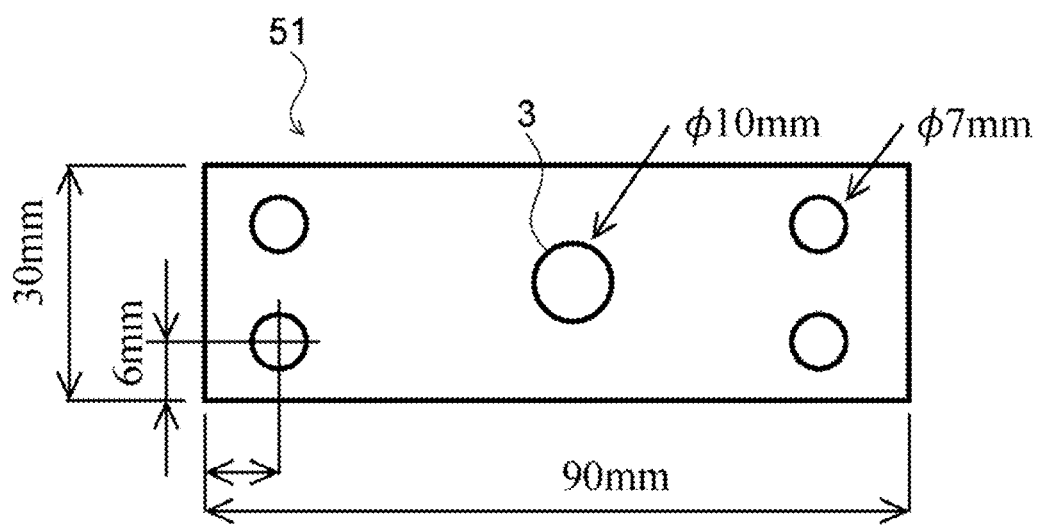
FIG. 5 is a diagram illustrating a fatigue specimen used in a fatigue test in an example.

Subsequently, a fatigue specimen 51 having the punched hole 3 as illustrated in FIG. 5 was produced from the metal sheet 1 having the punched hole 3 formed using the punching device 11. Then, using a Shenck plane bending fatigue-testing device, a fatigue test was performed in which a load was repeatedly applied to the fatigue specimen 51 by double swing.

In the fatigue test, the time point when the torque decreased by 30% at a normal stress of 300 MPa was determined as fatigue fracture, and the number of repetitions of load until fracture was measured. In addition, the load was set to be applied until 2 million times, and the fatigue test was terminated.

In the experiment, an example using the fatigue specimen 51 having the punched hole 3 formed using the punching device 11 was set as an invention example. Further, as a comparison target, an example in which the fatigue specimen 51 having the punched hole 3 formed using an integrated punch having the same diameter as the punching part 19 of the punching device 11 was prepared and subjected to the same fatigue test as described above was set as a conventional example. Table 1 illustrates the results of the fatigue test.

TABLE 1

| Whether there is coated abrasive | Number of repetitions of load applied until fracture | Remarks |
|---|---|---|
| There is no coated abrasive | 480,000 times | Conventional example |
| There is coated abrasive | 2 million times or more (not fractured) | Invention example |

From Table 1, in the conventional example, the fatigue specimen 51 was fractured at the number of repetitions of 480,000 times. On the other hand, in the invention example, the fatigue specimen was not fractured even after the number of repetitions of 2 million times, and the fatigue life was improved by 4 times or more as compared with the conventional example.

INDUSTRIAL APPLICABILITY

According to the present invention, it is possible to provide a metal sheet punching device capable of forming a punched hole having improved properties of a sheared edge in one step without requiring another mold in addition to a mold for forming a punched hole, inhibiting a crack from being generated in the sheared edge, and improving fatigue strength.

REFERENCE SIGNS LIST

1 METAL SHEET
1a SURFACE
3 PUNCHED HOLE
5 SHEARED EDGE
5a SHEAR SURFACE
5b FRACTURE SURFACE
7 CRACK
11 PUNCHING DEVICE
13 DIE
13a OPENING
15 PUNCH
17 MAIN BODY PART
19 PUNCHING PART
19a CROSS-SECTION ORTHOGONAL TO CENTRAL AXIS
21 ROTATING PART
23 COATED ABRASIVE
25 SPRING
27 ROTATIONAL MOTION CONVERSION DEVICE
29 PLATE-SHAPED RACK
31 FIRST GEAR
31a FIRST SPUR GEAR PART
31b FIRST BEVEL GEAR PART
31c FIRST GEAR SHAFT PART
33 SECOND GEAR
33a SECOND BEVEL GEAR PART
33b SECOND SPUR GEAR PART
33c SECOND GEAR SHAFT PART
35 GEAR SUPPORT
37 CYLINDRICAL RACK
39 DROP PREVENTING MECHANISM
41 HOLE PART
43 DROP PREVENTING ROD
43a STOPPER
51 FATIGUE SPECIMEN

The invention claimed is:

1. A metal sheet punching device comprising:
a die including a circular opening and configured to support a metal sheet; and
a punch configured to form a circular punched hole in the metal sheet supported by the die, wherein
the punch moves toward the die, wherein the punch includes:
a main body part;
a cylindrical punching part provided at a distal end;
a rotating part disposed between the main body part and the punching part so as to be rotatable about a central axis of the punching part as a rotation axis;
a coated abrasive provided on an outer circumferential surface of the rotating part and configured to polish a sheared edge of the punched hole;
a spring disposed between the main body part and the punching part such that the spring is capable of contracting and extending in a punching direction, the spring being configured to contract and accumulate a part of a punching load as elastic energy until the punching part comes into contact with and punches the metal sheet, release the elastic energy, and extend after the punching part punches the metal sheet; and
a rotational motion conversion device configured to convert a linear motion in the punching direction of the punching part due to extension of the spring into a rotary motion of the rotating part.

2. The metal sheet punching device according to claim 1, wherein the rotational motion conversion device includes:
a plate-shaped rack provided to extend in the punching direction from a distal end of the main body part;
a first gear disposed so as to be rotatable about an axis orthogonal to the punching direction and including
a first spur gear part meshing with the plate-shaped rack, and
a first bevel gear part provided coaxially with the first spur gear part;
a second gear disposed so as to be rotatable about an axis parallel to the punching direction and including
a second bevel gear part meshing with the first bevel gear part, and
a second spur gear part provided coaxially with the second bevel gear part;
a gear support provided in the punching part to rotatably support each of the first gear and the second gear; and
a cylindrical rack provided on an inner circumferential surface side of the rotating part and configured to mesh with the second spur gear part.

* * * * *